United States Patent
Koba

(10) Patent No.: US 7,055,965 B2
(45) Date of Patent: Jun. 6, 2006

(54) PROJECTION TYPE VIDEO DISPLAY

(75) Inventor: Hiroki Koba, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 35 days.

(21) Appl. No.: 10/878,215

(22) Filed: Jun. 29, 2004

(65) Prior Publication Data

US 2005/0001938 A1    Jan. 6, 2005

(30) Foreign Application Priority Data

Jul. 1, 2003    (JP)    ............................. 2003-189195
Feb. 23, 2004    (JP)    ............................. 2004-046990

(51) Int. Cl.
G03B 21/14    (2006.01)
G03B 21/20    (2006.01)
F21V 17/02    (2006.01)
G02F 1/1335    (2006.01)

(52) U.S. Cl. ............................. 353/88; 353/91; 353/93; 353/97; 353/102; 362/321; 362/324; 359/578; 349/7

(58) Field of Classification Search .................. 353/88, 353/20, 31, 37, 38, 84, 97–99, 102, 89, 90, 353/91, 93; 349/5, 7, 25; 359/5, 6, 20, 25, 359/200, 578, 594; 345/63, 101, 690; 362/268, 362/282, 322, 321, 324

See application file for complete search history.

(56) References Cited

U.S. PATENT DOCUMENTS

2001/0015775 A1 * 8/2001 Yamamoto et al. ............ 349/5
2003/0086265 A1 * 5/2003 Ilsaka et al. ................ 362/268

FOREIGN PATENT DOCUMENTS

JP    2002-365607    12/2002

* cited by examiner

Primary Examiner—W. B. Perkey
Assistant Examiner—Rochelle Blackman
(74) Attorney, Agent, or Firm—Westerman, Hattori, Daniels & Adrian, LLP

(57) ABSTRACT

A shutter device comprises a plurality of shutters. Each of the shutters is provided at a position in the vicinity of a fly's eye lens positioned on the side of a polarization conversion system (one of fly's eye lenses in an integrator lens) and not preventing the passage of effective illuminating light. Each of the shutters is constructed as a first shutter or a second shutter. The first shutter is constructed so as to block an upper one-third region and a lower one-third region of the fly's eye lens, and the second shutter is constructed so as to block an intermediate one-third region of the fly's eye lens

10 Claims, 8 Drawing Sheets

PROJECTION TYPE VIDEO DISPLAY

BACKGROUND OF THE INVENTION

1. Field of the Invention

The present invention relates to a projection type video display such as a liquid crystal projector.

2. Description of the Background Art

As a method of utilizing a liquid crystal projector, a video signal outputted from a personal computer is received, to project a video. That is, when a person who makes a presentation operates a personal computer to display a video which he or she desires to make participants see on a display of the personal computer, the same video as the displayed video is enlarged and projected on a screen by a liquid crystal projector, so that all the participants can see the video. On the other hand, the person who makes a presentation may not, in some cases, desire a video which appears during an operation to be viewed by the participants. In order to cope with such a request, a liquid crystal projector in which a shading plate for temporarily blocking the projection of the video is slidably constructed has been proposed (see JP-A-2002-365607).

SUMMARY OF THE INVENTION

Since a shading plate in a state where it does not block the projection of a video must be positioned outside an optical path, however, a sliding space for the shading plate is required outside the optical path, so that a shading device increases in size. Further, the shading plate cannot be rapidly slid. Therefore, a time period is required to block the projection of the video.

In view of the foregoing circumstances, an object of the present invention is to provide a projection type video display capable of saving a space as well as rapidly shading light and easily setting light amounts at a plurality of levels.

In order to solve the above-mentioned problem, in a projection type video display that optically modulates light emitted from a light source by a light valve and projects a video, a projection type video display according to the present invention is characterized by comprising an integrator lens composed of a pair of fly's eye lenses arranged on the emitting side of the light source; a plurality of shading plates respectively arranged at positions deviating from effective optical paths between the pair of fly's eye lenses; and a rotation driving unit for rotating the plurality of shading plates to respectively block the effective optical paths.

In the above-mentioned configuration, illuminating light is shaded between the pair of fly's eye lenses, thereby making it possible to prevent the light from being incident on the light valve when the projection of the video is temporarily stopped as well as to set light amounts at a plurality of levels corresponding to the number of lenses composing the fly's eye lens, for example. Further, it is possible to save a space of a device for blocking the projection of a video as well as rapidly shading light.

The projection type video display may be so configured that each of the shading plates is formed so as to have a length corresponding to the width or the height of the fly's eye lens, and the effective optical paths corresponding to a group of lenses in a column or a row composing the fly's eye lens are blocked.

In this configuration, if the shading plates are individually rotated, for example, it is possible to set light amounts at a plurality of levels corresponding to the number of columns or rows composing the fly's eye lens. If the shading plates are rotated in group units, it is possible to set light amounts at a plurality of levels corresponding to the number of groups and it is easy to simplify the rotation driving unit by the grouping.

The projection type video display may be so configured that each of the shading plates is divided into two or more shading plates, and is formed so as to have a length corresponding to the width or the height of the fly's eye lens as a whole, the effective optical paths corresponding to a group of lenses in a column or a row composing the fly's eye lens are blocked by the whole of the divided shading plate, and the effective optical path corresponding to predetermined one of the lenses in a column or a row composing the fly's eye lens is blocked by a part of the divided shading plate.

In this configuration, the corresponding divided shading plates are grouped and rotated, for example, thereby making it possible to set light amounts at a plurality of levels while simplifying the rotation driving unit.

The divided shading plates may be respectively rotated by different rotating shafts.

Each of the divided shading plates may comprise an integrally rotating unit which is fastened to a single rotating shaft and is rotated integrally therewith, and an independently rotating unit which is loosely fitted in the single rotating shaft to rotate.

The divided shading plates constituting the same shading plate may be arranged such that their respective parts are overlapped with one another.

The projection type video display may be so configured that the shading plate is rotated, to block the adjacent effective optical paths on both sides.

In this configuration, the number of components can be reduced.

The projection type video display may be so configured that some of the plurality of shading plates are rotated, or a part of each of the shading plates is rotated, to form a state where the whole or a part of light at the periphery of the light source is shaded.

The light at the periphery of the light source is shaded, thereby making it possible to improve the contrast of the projected video.

When an operation for requesting high contrast is performed by a user, a state where the whole or a part of the light at the periphery of the light source is shaded may be formed.

The projection type video display may be so configured that the shading plate is rotated by an actuator.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A liquid crystal projector according to an embodiment of the present invention will be described on the basis of FIGS. 1 to 8.

Figure 1:
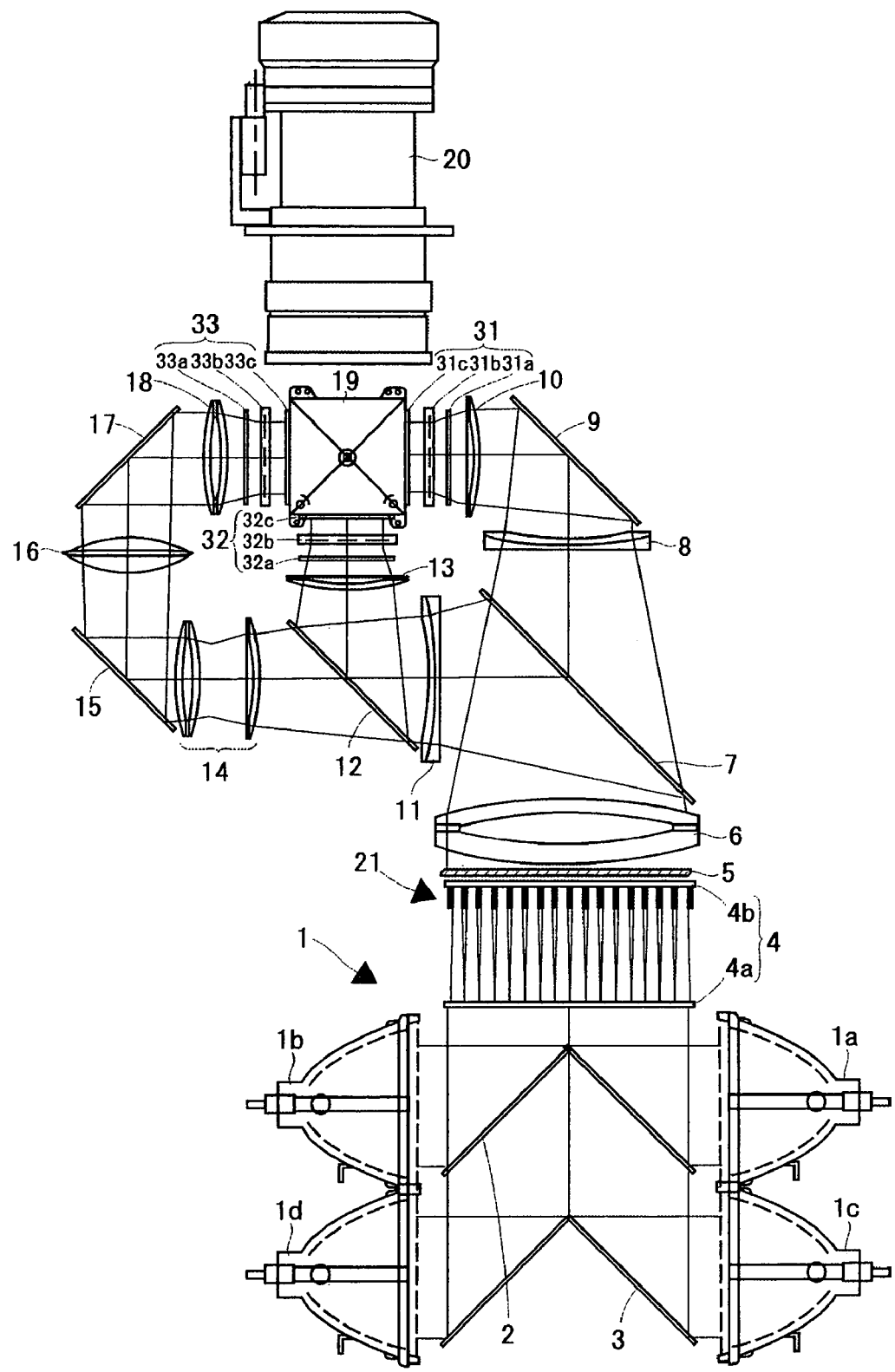
FIG. 1 is a diagram showing the configuration of a liquid crystal projector according to an embodiment of the present invention.

FIG. 1 is a diagram showing a four-lamp and three-panel liquid crystal projector according to an embodiment of the present invention. An illuminating device 1 comprises four light sources 1a, 1b, 1c, and 1d, a mirror 2 arranged between the light sources 1a and 1b, and a mirror 3 arranged between the light sources 1c and 1d. Each of the light sources is composed of a ultra-high pressure mercury lamp, a metal halide lamp, a xenon lamp, or the like, and its irradiated light is emitted after being changed into parallel lights by a parabolic reflector, to be introduced into an integrator lens 4.

The integrator lens 4 comprises a pair of fly's eye lenses 4a and 4b. Each of the pair of lenses introduces light emitted from the illuminating device 1 into the whole surface of a liquid crystal light valve, described later, to average partial non-uniformity in luminance which exists in the illuminating device 1 and reduce the difference between light amounts at the center and the periphery of a screen. The light which has passed through the integrator lens 4 is introduced into a first dichroic mirror 7 after passing through a polarization conversion system 5 and a condenser lens 6.

The polarization conversion system 5 is composed of a polarizing beam splitter array (hereinafter referred to as a PBS array). The PBS array comprises polarized light separating surfaces and retardation plates (½ λ plates). Each of the polarized light separating surfaces in the PBS array passes P-polarized light and changes an optical path of S-polarized light by 90 degrees, for example, of lights from the integrator lens 4. The S-polarized light whose optical path has been changed is reflected on the adjacent polarized light separating surface and is emitted as it is. On the other hand, the P-polarized light which has passed through the polarized light separating surface is emitted after being converted into S-polarized light by the retardation plate arranged on the front side (on the light exit side). That is, nearly all the lights are converted into S-polarized lights in this case.

The first dichroic mirror 7 transmits light in a red wavelength band and reflects light in a cyan (green+blue) wavelength band. The light in the red wavelength band which has passed through the first dichroic mirror 7 is reflected on a reflecting mirror 9 through a concave lens 8 so that its optical path is changed. The red light reflected on the reflecting mirror 9 is optically modulated by passing through a transmission type liquid crystal light valve for red light 31 through a lens 10. On the other hand, the light in the cyan wavelength band which has been reflected on the first dichroic mirror 7 is introduced into a second dichroic mirror 12 through a concave lens 11.

The second dichroic mirror 12 transmits light in a blue wavelength band and reflects light in a green wavelength band. The light in the green wavelength band which has been reflected on the second dichroic mirror 12 is introduced into a transmission type liquid crystal light valve for green light 32 through a lens 13, and is optically modulated by passing through the liquid crystal light valve 32. The light in the blue wavelength band which has passed through the second dichroic mirror 12 is introduced into a transmission type liquid crystal light valve for blue light 33 through a relay lens 14, a total reflecting mirror 15, a relay lens 16, a reflecting mirror 17, and a relay lens 18, and is optically modulated by passing through the liquid crystal light valve 33.

The liquid crystal light valves 31, 32, and 33 respectively comprise incidence-side light polarizing plates 31a, 32a, and 33a, panels 31b, 32b, and 33b constructed by sealing a liquid crystal between a pair of glass boards (having a pixel electrode and an alignment film formed therein), and output side light polarizing plates 31c, 32c, and 33c.

Modulated lights (video lights in respective colors) modulated by respectively passing through the liquid crystal light valves 31, 32, and 33 are mixed by a cross dichroic prism 19, to be color video light. The color video light is enlarged and projected by a projection lens 20, and is projected and displayed on a screen (not shown).

Figure 2A:
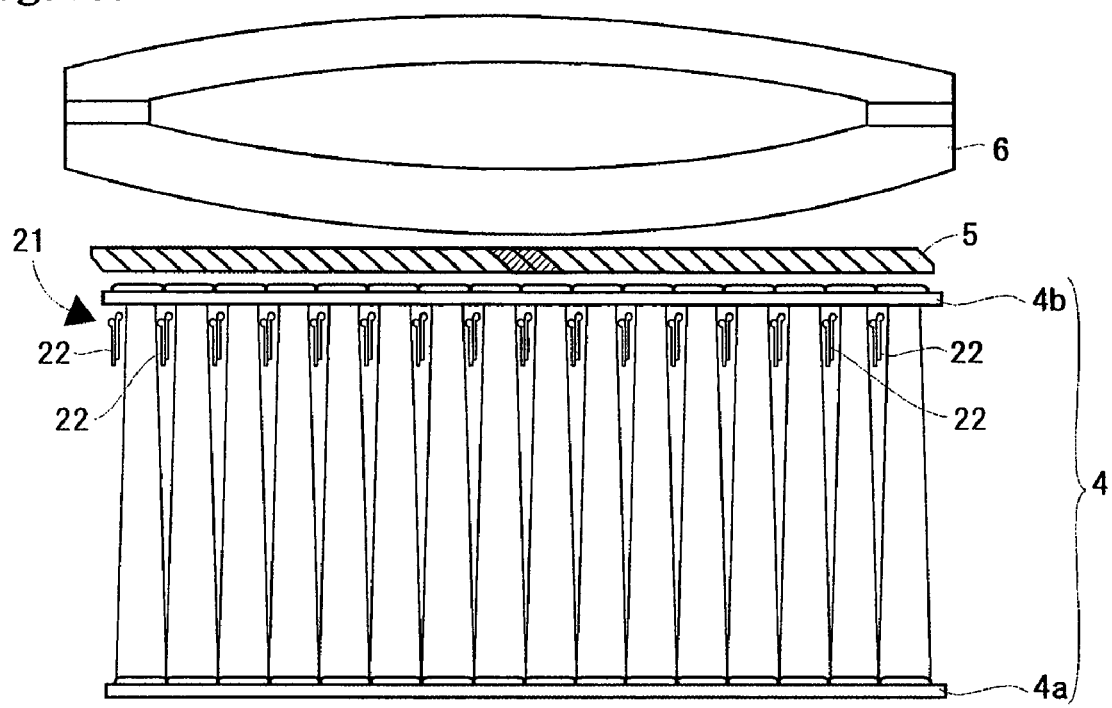
FIG. 2A is an enlarged plan view showing a portion where a shutter device is arranged.
Figure 2B:
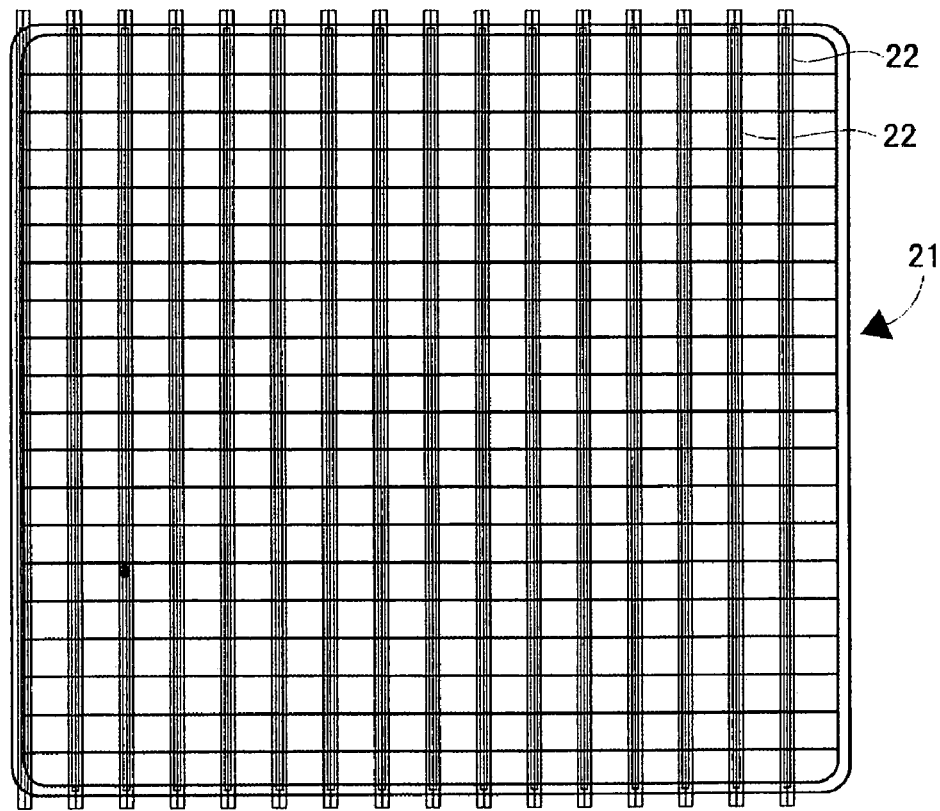
FIG. 2B is an enlarged front view showing a portion where a shutter device is arranged.
Figure 3:
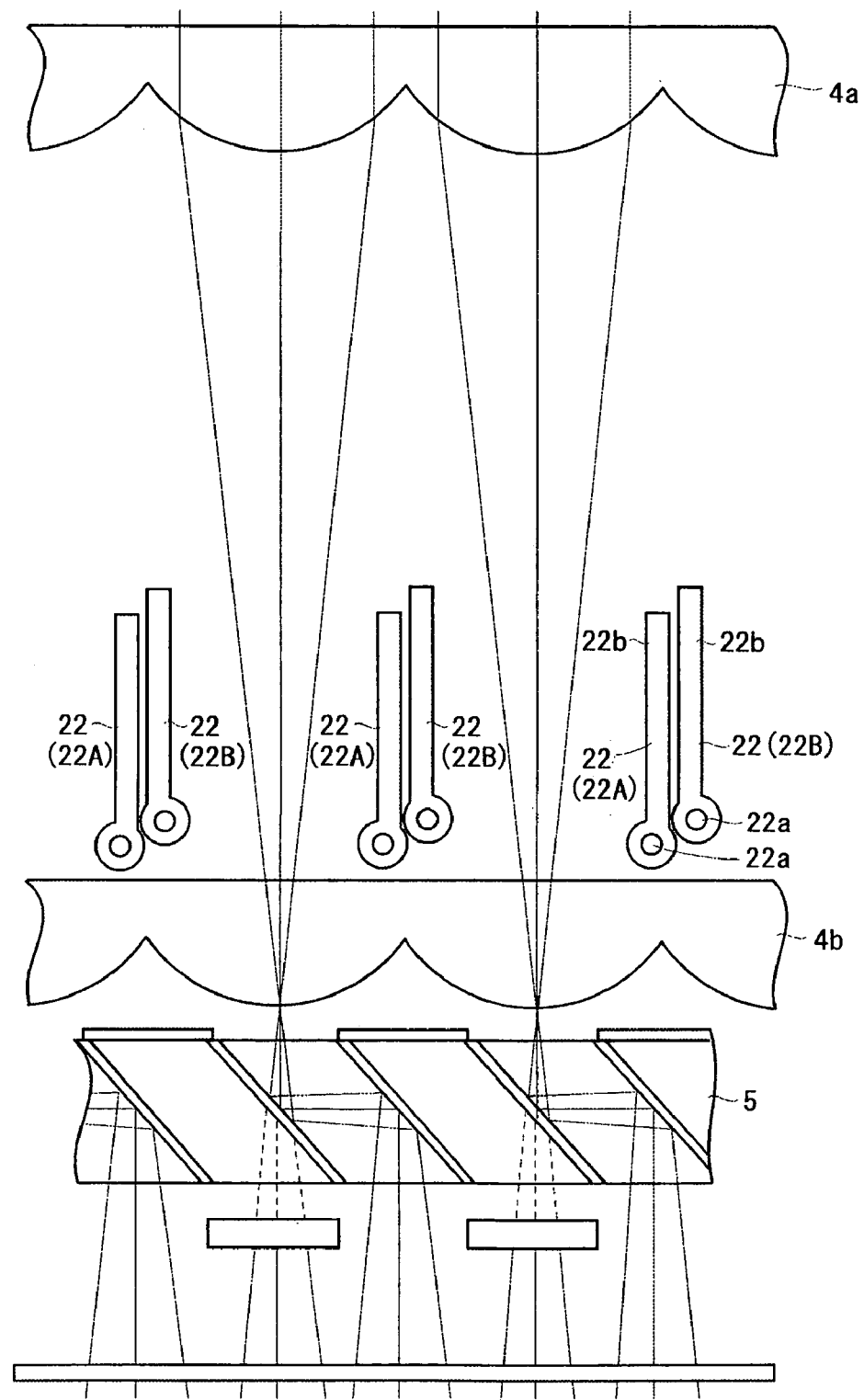
FIG. 3 is a plan view showing a portion where a shutter device is arranged in further enlarged fashion.
Figure 4A:
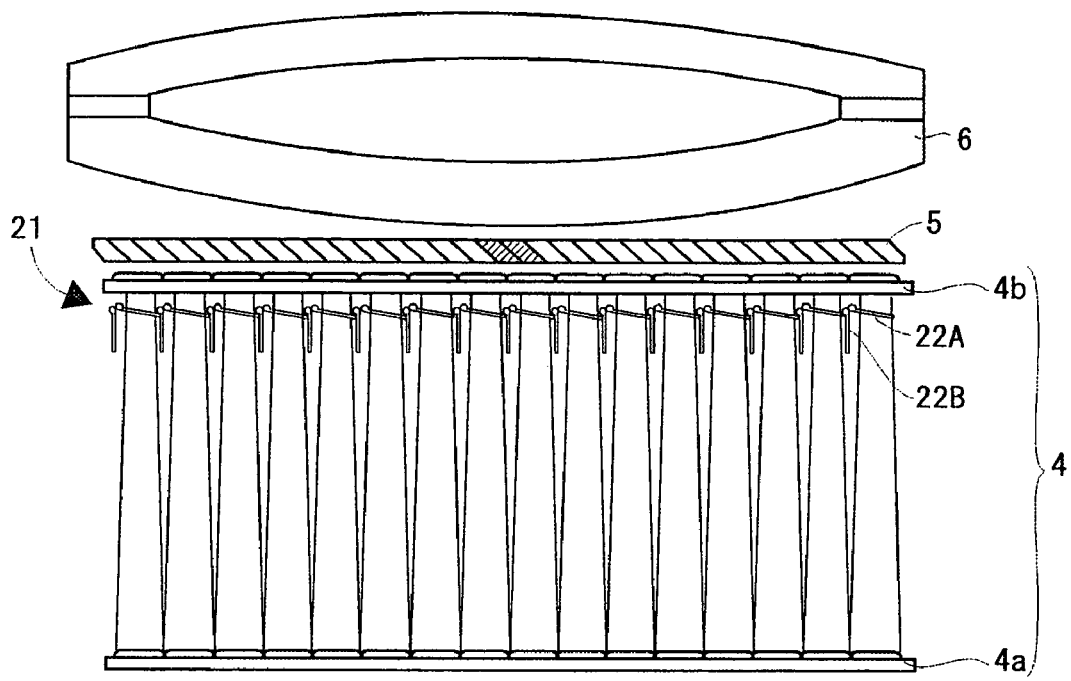
FIG. 4A is an enlarged plan view showing a portion where a shutter device is arranged.
Figure 4B:
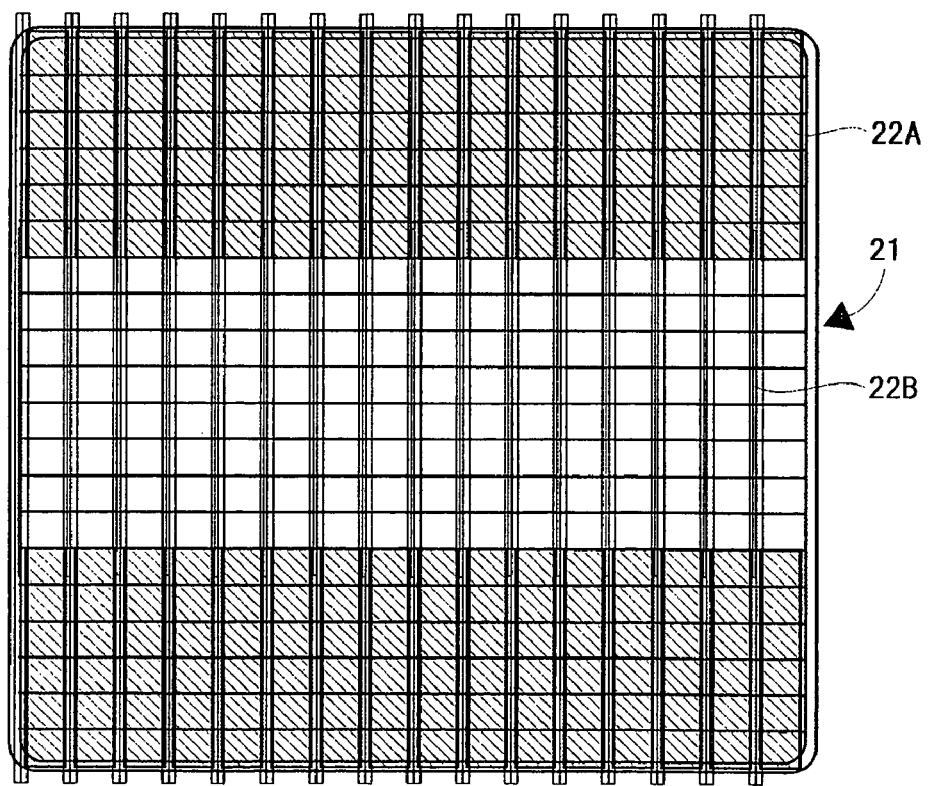
FIG. 4B is an enlarged front view showing a portion where a shutter device is arranged.
Figure 5A:
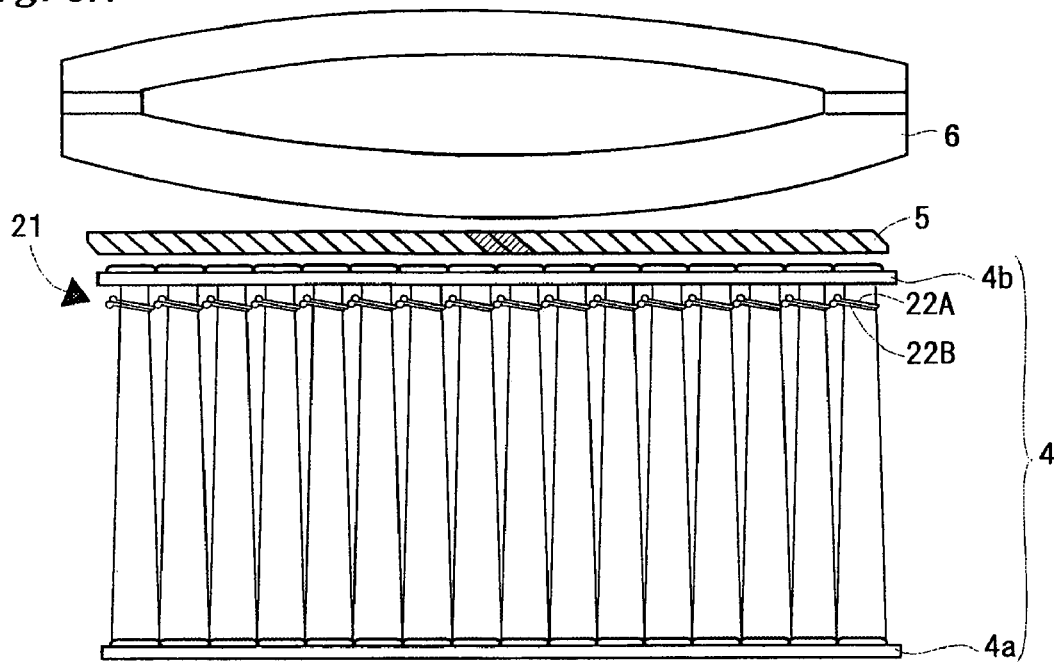
FIG. 5A is an enlarged plan view showing a portion where a shutter device is arranged.
Figure 5B:
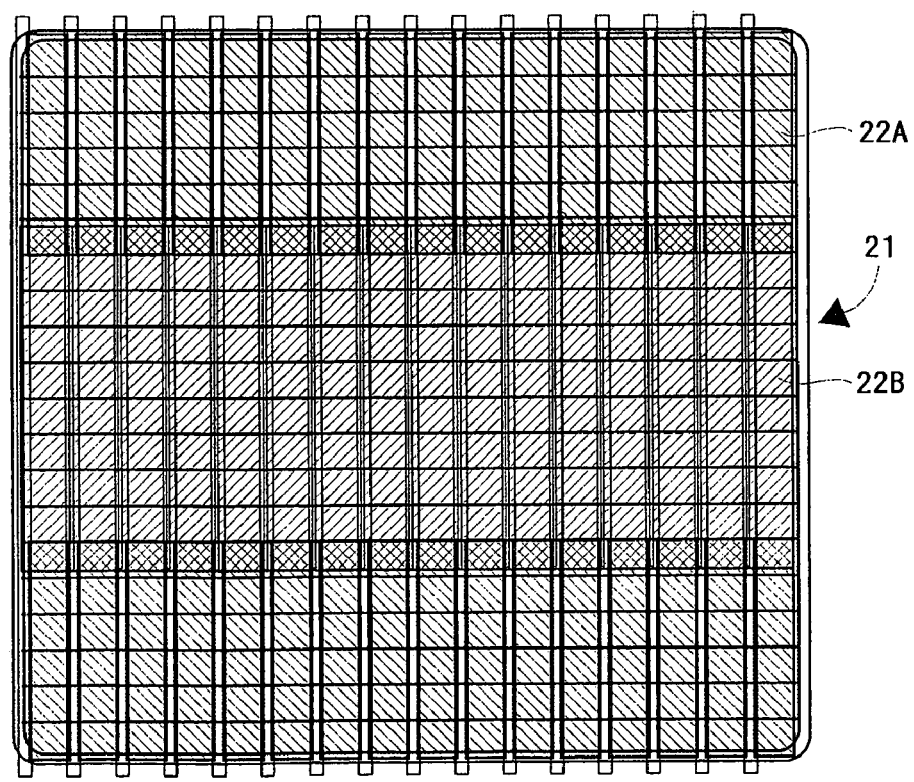
FIG. 5B is an enlarged front view showing a portion where a shutter device is arranged.

A shutter device 21 comprises a plurality of shutters 22, as shown in FIGS. 2A, 2B, and 3. Each of the shutters 22 is provided at a position in the vicinity of the fly's eye lens 4b positioned on the side of the polarization conversion system 5 and not preventing the passage of effective illuminating light. Each of the shutters 22 is constructed as a first shutter 22A or a second shutter 22B. The first shutter 22A is constructed so as to block an upper one-third region and a lower one-third region of the fly's eye lens, and the second shutter 22B is constructed so as to block an intermediate one-third region of the fly's eye lens, as shown in FIGS. 4A, 4B, 5A, and 5B.

Each of the shutters 22 comprises a shaft 22a arranged in the longitudinal direction and a shading plate 22b fastened to the shaft 22a. In the first shutter 22A, the shading plate 22b is positioned in correspondence with the upper one-third region and the lower one-third region of the fly's eye lens. In the second shutter 22B, the shading plate 22b is positioned in correspondence with the intermediate one-third region of the fly's eye lens. The shading plate 22b is constructed by applying a black light absorber on resin or a metal member so as to absorb received light. The shaft 22a is rotated by approximately 90 degrees, thereby making it possible to switch a light shielding state and a transmitted state of the illuminating light. When both the first shutter 22A and the second shutter 22B enter a light shielding state, short side portions at respective upper and lower ends of the shutters are overlapped with each other, thereby preventing light from leaking (see FIG. 5B). The adjacent shading plates 22b on the right and left sides are so set that their right and left edges are overlapped with each other in a light shielding state, thereby preventing light from leaking (see FIG. 5A).

Figure 6:
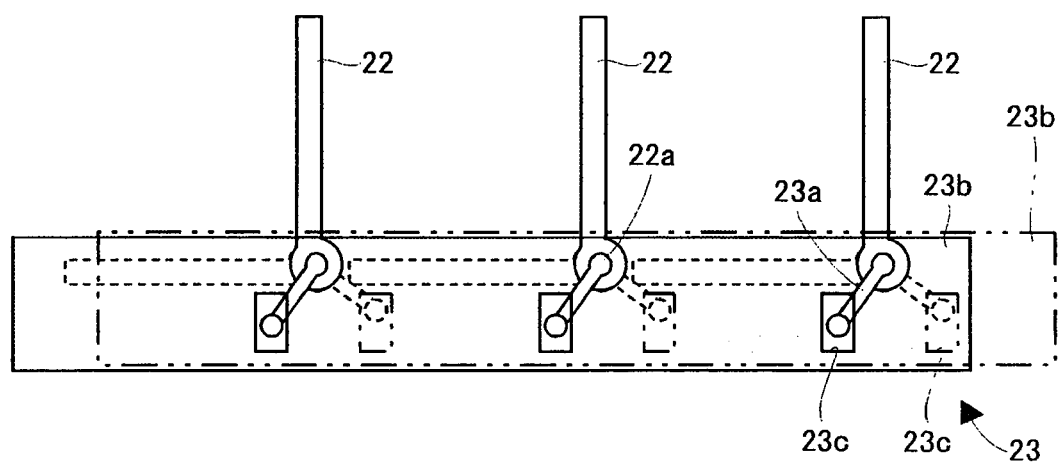
FIG. 6 is a plan view showing a shutter driving mechanism.

The shaft 22a is rotated by a driving mechanism 23, as shown in FIG. 6. The driving mechanism 23 comprises a link (a bending portion) 23a connected to the shaft 22a, a plate member 23b formed so as to extend in the same direction as the direction in which the shutters 22 are arranged, and an engaging slot 23c formed in the plate member 23b. An engaging projection (which exists at a position eccentric from the shaft 22a) of the link 23a is engaged with the engaging slot 23c. The plate member 23b is moved along its length, thereby making it possible to rotate the shaft 22a by approximately 90 degrees. A driving force for moving the plate member 23b may be applied by a manual operation or an actuator such as an electromagnetic solenoid.

In the above-mentioned configuration, the illuminating light is shaded between the pair of fly's eye lenses 4a and 4b, thereby making it possible to prevent the light from being incident on the liquid crystal light valves 31, 32, and 33 in a case where the projection of the video is temporarily stopped. Further, a plurality of modes such as a screen projection mode for a personal computer and a moving image projection mode for a movie or the like are prepared. The configuration can easily cope with variable setting of the levels of amounts of light incident on the light valves in the plurality of modes. Here, the degree of parallelization of light at the periphery of the light source 1a, 1b, 1c, 1d is low, which causes reducing contrast. When only the first shutter 22A forms a light shielding state, only the light at the periphery of the light source 1a, 1b, 1c, 1d enters a light shielding state (a state where light at the center thereof is made use of), thereby realizing high contrast, which is suitable in the projection mode for a movie or the like. That is, if processing for making the light amount slightly lower is performed in a case where a button "a movie mode", for example, is operated by a user, it is preferable to not shade the light at the center of the light source (or perform not shading so as to include the light at the center of the light source) but shade only the light at the periphery of the light source. When not shading serving as adjustment of light amounts but an operation for requesting high contrast (e.g., pressing of a "high contrast button" provided in a remote controller (not shown) or an operation panel on a surface of a frame) is performed by the user, only the first shutter 22A may be brought into a light shielding state to form a state where only the light at the periphery of the light source is shaded.

Figure 7:
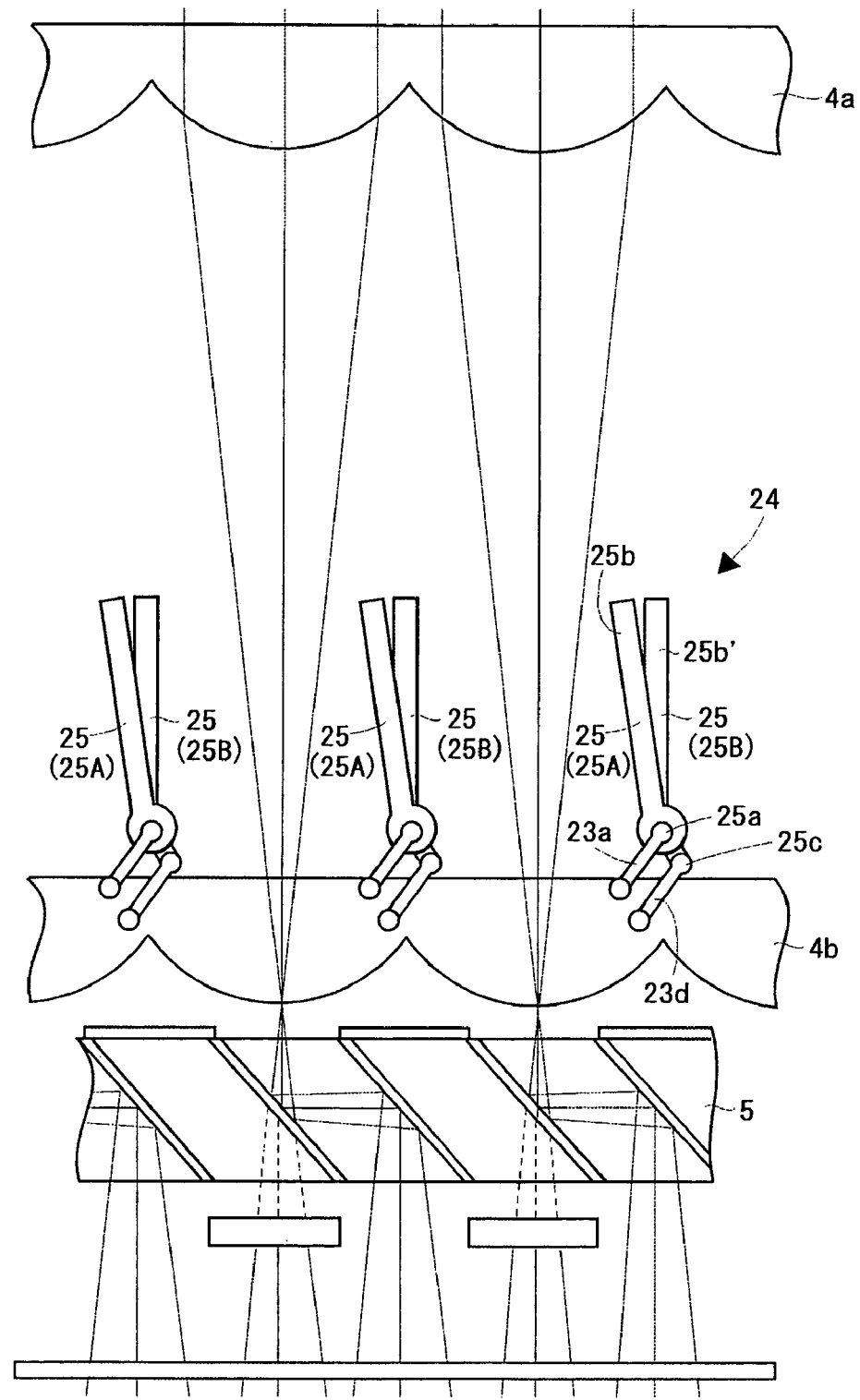
FIG. 7 is an enlarged plan view showing a portion where a shutter device having another configuration is arranged.

FIG. 7 illustrates a shutter device 24. The shutter device 24 comprises a plurality of shutters 25. Each of the shutters 25 is provided at a position in the vicinity of the fly's eye lens 4b positioned on the side of the polarization conversion system 5 and not preventing the effective optical path. Each of the shutters 25 is constructed as a first shutter 25A or a second shutter 25B. The first shutter 25A is constructed so as to block an upper one-third region and a lower one-third region of the fly's eye lens, and the second shutter 25B is constructed so as to block an intermediate one-third region of the fly's eye lens, for example.

The first shutter 25A is composed of a shading plate 25b fastened to a shaft 25a arranged in the longitudinal direction, and the second shutter 25B is composed of a shading plate 25b' loosely fitted in the shaft 25a. The link 23a in the driving mechanism 23 is connected to the shaft 25a. On the other hand, a projection projecting in a direction away from the shaft 25a and extending upward (projecting upward from an upper end of the fly's eye lens 4b) is formed in the shading plate 25b', and a second link 23d is connected to the projection. In the shutter device 24 having such a configuration, it is possible to reduce the number of components and save a space in arrangement by sharing the shaft.

Figure 8:
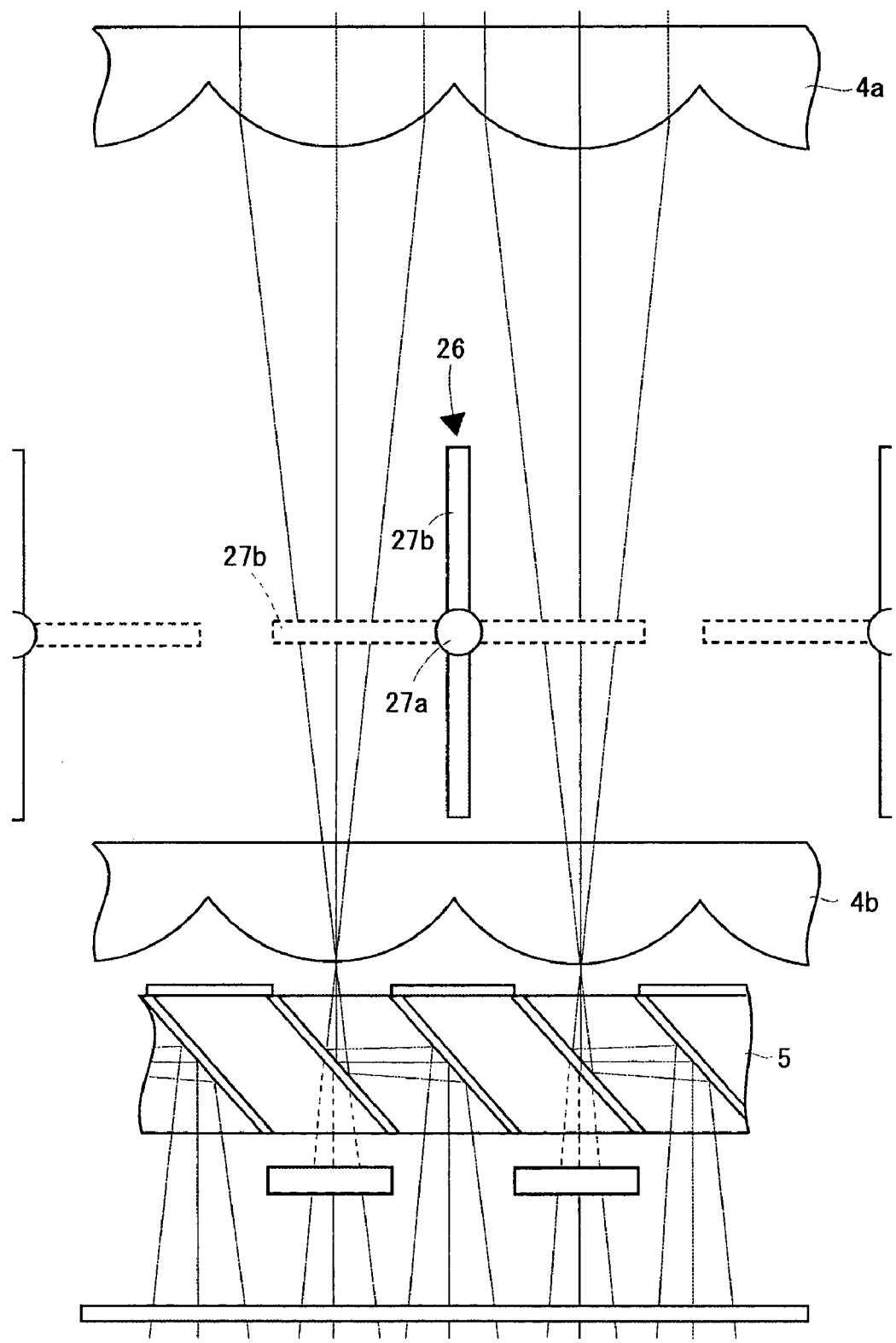
FIG. 8 is an enlarged plan view showing a portion where a shutter device having a further configuration is arranged.

FIG. 8 illustrates a shutter device 26. The shutter device 26 comprises a plurality of shutters 27. Each of the shutters 27 is provided at a position in the vicinity of the fly's eye lens 4b positioned on the side of the polarization conversion system 5 and not preventing the passage of effective illuminating light. Each of the shutters 27 comprises a shaft 27a and a shading plate 27b. The shading plate 27b has a width capable of shading adjacent effective illuminating lights on both sides, and the shaft 27a is positioned at the center thereof. The shutter device 26 having such a configuration makes it possible to reduce the number of shutters 27 to one-half that in the above-mentioned configuration. Of course, even in the shutter device 26 having such a configuration, it is also possible to employ such a divisional configuration that each of the shutters 27 comprises a first shutter and a second shutter which are independent from each other.

Although such a configuration that shading on the side of upper and lower edges and overall shading of the integrator lens 4 are performed is illustrated as the divisional configuration of the shading plate, the present invention is not limited to the same. For example, such a configuration that at least one of shading at an upper edge, shading at a lower edge, shading at a right edge, shading at a left edge, shading at right and left edges, and shading at corners can be arbitrarily performed may be used. Alternatively, the shading is not limited to shading at two levels (partial shading and overall shading). For example, a plurality of states where partial shading is performed may be set to perform shading at a multiple level such as three or more levels.

Such a configuration that a shading plate is not divided may be adapted. For example, each of shading plates is formed so as to have a length corresponding to the width or the height of a fly's eye lens, and effective optical paths corresponding to a group of lenses in a column or a row composing the fly's eye lens are blocked. If the shading plates are individually rotated, it is possible to set light amounts at a plurality of levels corresponding to the number of columns or rows composing the fly's eye lens.

Furthermore, video contrast and light amounts can be gradually changed by gradually forming a light shielding state from the shading plates positioned around the light source 1a, 1b, 1c, 1d.

If the shading plates are rotated in group units, it is possible to set light amounts at a plurality of levels corresponding to the number of groups as well as to simplify a rotation driving unit by grouping. Further, one shading plate can be also arranged with respect to one of lenses composing the fly's eye lens. In such a case, it is possible to set light amounts at a plurality of levels corresponding to the number of lenses.

As described in the foregoing, according to the present invention, it is possible to save a space of a device for blocking the projection of a video as well as rapidly shading light. Further, it is possible to easily set amounts of illuminating light at a plurality of levels. Furthermore, the effect of forming a state where only light at the periphery of a light source is shaded to realize high contrast is produced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display that optically modulates light emitted from a light source by a light valve and projects a video, comprising:
   an integrator lens composed of a pair of fly's eye lenses arranged on the emitting side of the light source;
   a plurality of shading plates respectively arranged at positions deviating from effective optical paths between the pair of fly's eye lenses; and a rotation driving unit for rotating said plurality of shading plates to respectively block the effective optical paths, wherein a first state in which light from the light source is not blocked by the shading plates and a second state in which all the light from the light source is blocked by the shading plates, and intermediate states where some of the light from the light source is blocked.

2. The projection type video display according to claim 1, wherein
each of the shading plates is formed so as to have a length corresponding to the width or the height of the fly's eye lens, and
the effective optical paths respectively corresponding to lenses in a column or a row composing the fly's eye lens are blocked.

3. The projection type video display according to claim 1, wherein
each of the shading plates is divided into two or more shading plates, and is formed so as to have a length corresponding to the width or the height of the fly's eye lens as a whole,
the effective optical paths corresponding to a group of lenses in a column or a row composing the fly's eye lens are blocked by the whole of the divided shading plate, and
the effective optical path corresponding to predetermined one of the lenses in a column or a row composing the fly's eye lens is blocked by a part of the divided shading plate.

4. The projection type video display according to claim 3, wherein
the divided shading plates are respectively rotated by different rotating shafts.

5. The projection type video display according to claim 3, wherein
each of the divided shading plates comprises
an integrally rotating unit which is fastened to a single rotating shaft and is rotated integrally therewith, and
an independently rotating unit which is loosely fitted in the single rotating shaft to rotate.

6. The projection type video display according to claim 3, wherein
the divided shading plates constituting the same shading plate are arranged such that their respective parts are overlapped with one another.

7. The projection type video display according to claim 1, wherein
the shading plate is rotated, to block the adjacent effective optical paths on both sides.

8. The projection type video display according to claim 1, wherein
some of the plurality of shading plates are rotated, or a part of each of the shading plates is rotated, to form a state where the whole or a part of light at the periphery of the light source is shaded.

9. The projection type video display according to claim 8, wherein
when an operation for requesting high contrast is performed by a user, a state where the whole or a part of the light at the periphery of the light source is shaded is formed.

10. The projection type video display according to claim 1, wherein
the shading plate is rotated by an actuator.

* * * * *